(12) United States Patent
Stenfort

(10) Patent No.: US 8,190,983 B2
(45) Date of Patent: May 29, 2012

(54) APPARATUS AND METHODS FOR CRC ERROR INJECTION IN A STORAGE SYSTEM

(75) Inventor: Ross J. Stenfort, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 1021 days.

(21) Appl. No.: 12/138,321

(22) Filed: Jun. 12, 2008

(65) Prior Publication Data

US 2009/0313411 A1 Dec. 17, 2009

(51) Int. Cl.
G06F 11/10 (2006.01)
G06F 11/00 (2006.01)
G11C 29/00 (2006.01)

(52) U.S. Cl. ............... 714/807; 714/25; 714/41; 714/42; 714/769; 714/805

(58) Field of Classification Search ............... 714/25, 714/41, 42, 769, 805, 807
See application file for complete search history.

(56) References Cited

U.S. PATENT DOCUMENTS

| | | | | |
|---|---|---|---|---|
| 5,796,938 | A * | 8/1998 | Emberty et al. | 714/27 |
| 6,061,753 | A * | 5/2000 | Ericson | 710/107 |
| 6,304,984 | B1 * | 10/2001 | Neal et al. | 714/57 |
| 6,442,628 | B1 * | 8/2002 | Bastiani et al. | 710/60 |
| 6,519,718 | B1 * | 2/2003 | Graham et al. | 714/41 |
| 6,539,503 | B1 * | 3/2003 | Walker | 714/703 |
| 6,601,119 | B1 * | 7/2003 | Slutz et al. | 710/104 |
| 6,851,083 | B1 * | 2/2005 | Hagenauer et al. | 714/774 |
| 7,308,397 | B2 * | 12/2007 | Jibbe et al. | 703/24 |
| 7,366,957 | B2 * | 4/2008 | Paulsen et al. | 714/43 |
| 7,406,628 | B2 * | 7/2008 | Edgar et al. | 714/43 |
| 7,412,540 | B2 * | 8/2008 | Seto et al. | 709/246 |
| 7,529,980 | B2 * | 5/2009 | Henning et al. | 714/41 |
| 7,761,642 | B2 * | 7/2010 | Stenfort | 710/306 |
| 7,941,575 | B2 * | 5/2011 | Roy et al. | 710/29 |
| 7,962,676 | B2 * | 6/2011 | Stenfort | 710/72 |
| 8,065,133 | B1 * | 11/2011 | Asbridge | 703/23 |
| 2003/0196149 | A1 * | 10/2003 | Gygi et al. | 714/719 |
| 2006/0168273 | A1 * | 7/2006 | Michael | 709/230 |
| 2007/0192469 | A1 * | 8/2007 | Gentieu et al. | 709/223 |
| 2007/0226419 | A1 * | 9/2007 | Roy et al. | 711/118 |

(Continued)

OTHER PUBLICATIONS

Zhang, Ming and Qing Yang. "Evaluating Availability of Networked Storages Using Commercial Workload." IN: Proceedings of the Sixth Workshop on Computer Architecture Evaluation Using Commercial Workloads (CAECW), Feb. 2003, pp. 1-10.*

(Continued)

Primary Examiner — John J Tabone, Jr.
(74) Attorney, Agent, or Firm — Duft Bornsen & Fishman LLP

(57) ABSTRACT

Apparatus and methods for Cyclic Redundancy Check (CRC) error injection between storage controllers and storage devices in a storage system. A plurality of bridge devices are configured in a storage system each coupled persistently coupled to a corresponding one of the plurality of storage devices. Each bridge device may couple to one or more Serial Attached SCSI (SAS) initiators for transferring exchanges between one or more SAS initiators and the attached target storage device. Each bridge device receives parameters from a SAS initiator or an administrative client directing the bridge regarding injection of CRC errors. A log memory in each bridge may log information regarding the injected CRC errors.

23 Claims, 5 Drawing Sheets

U.S. PATENT DOCUMENTS

2007/0271082 A1* 11/2007 Dominguez et al. ............ 703/20
2008/0028157 A1* 1/2008 Steinmetz et al. ............ 711/149
2008/0162811 A1* 7/2008 Steinmetz et al. ............ 711/114
2008/0163005 A1* 7/2008 Sonksen et al. ................ 714/41
2008/0247420 A1* 10/2008 Marks et al. .................. 370/475
2009/0240986 A1* 9/2009 Warren et al. .................. 714/32

OTHER PUBLICATIONS

LeCroy, SAS Infusion and SATA Infusion Error Injector and Traffic Modifier, LeCroy, 2005, pp. 1-6.*
Elliot, Serial Attached SCSI Link Layer—part 1, Sep. 30, 2003, HP, pp. 1-89.*

* cited by examiner

APPARATUS AND METHODS FOR CRC ERROR INJECTION IN A STORAGE SYSTEM

RELATED PATENTS

This patent is related to commonly owned U.S. patent application Ser. No. 11/644,549 entitled "Serial Advanced Technology Attachment (SATA) and Serial Advanced Small Computer System Interface (SCSI) (SAS) Bridging" which is hereby incorporated by reference. This patent is also related to commonly owned U.S. patent application Ser. Nos. 12/138,315 and 12/138,309 filed herewith which are also hereby incorporated by reference.

BACKGROUND

1. Field of the Invention

The invention relates generally to testing in storage system and more specifically relates to improvements in injection of CRC errors in communications with storage devices in a storage system for testing error recovery in the storage system.

2. Discussion of Related Art

Storage systems typically comprise a storage controller coupled to one or more storage devices. In large scale storage systems, multiple controllers and a large number of storage devices (e.g., disk drives) are typically housed in an enclosure. One or more host systems are coupled to one or more of the storage controller through storage networking protocols and media. The host systems apply I/O requests to the storage system through the storage controllers which, in turn, apply appropriate I/O operations to one or more of the storage devices within the storage system to write data or to retrieve previously written data.

The storage controllers are adapted to detect errors in the communications with the storage devices and to perform various types of error recovery processing to attempt to recover from the various types of error conditions. One common type of error condition is a Cyclic Redundancy Check (CRC) error detected in exchanges between the storage controller(s) and one or more storage devices. A CRC error represents detection of a bit (or multi-bit) error in the communication link between the storage controller(s) and a storage device. A CRC code is computed and transmitted with data in such an exchange. The receiving device computes its own CRC code based on the data as received. The receiving device compares its computed CRC code with the received CRC code to detect an error in transmission/reception of the data. CRC errors may arise in operational storage system due to electromagnetic noise or other environmental aspects of the operating storage system.

Design engineers and/or field support engineers dealing with storage systems often need to test the ability of elements of the storage system to properly recover from CRC errors. Design engineers may wish to test the design of their storage controller or storage device to verify proper detection and recovery from CRC errors. In like manner, field support engineers may wish to test CRC error recovery processing of a storage controller or a storage device to isolate a fault detected in a field installation of a storage system.

A common prior technique for such testing involves inserting a "jammer" device in the communication link between the storage controller(s) and a storage device. The jammer device is physically and electronically inserted between the two components and controllably injects bit errors in the exchanges between the controller(s) and the storage device. These injected bit errors will cause a CRC error to arise in the exchanges between the controller(s) and the storage device and thus enable the engineer to evaluate or debug recovery processing from CRC errors. Jammer devices for injecting CRC errors are well known and widely available for insertion into any of several widely used communication media and protocols.

Ad hoc insertion of a jammer device to test CRC error recovery gives rise to a number of problems. Insertion of a jammer in a storage system may cause physical/mechanical problems in that the jammer may not physically fit in the nominal mounting structure of the storage device to which it is to be attached. For example, in the context of larger storage systems, storage devices (e.g., disk drives) are typically mounted into a tray or carrier so that they may be readily inserted and removed from the storage system enclosures (e.g., for "hot swap" functionality). Further, electronic insertion of the jammer into the nominal connection between the storage controller(s) and the storage device alters the electronic characteristics of the coupling such that signal timings may change and other unintended errors may be introduced thereby. Still further, to test each storage device in a large storage system, a jammer would have to be inserted for each drive to be tested. Thus one jammer would have to be inserted, removed, and re-inserted numerous times to test each of a large number of drives or a large number of jammer devices would have to be provided at significant cost. Numerous other problems arise in use of such jammer devices in that they have little flexibility to alter the style of testing or to adapt to the specific testing needs of a particular application.

Thus it is an ongoing challenge to flexibly and effectively test CRC error recovery in storage systems.

SUMMARY

The present invention solves the above and other problems, thereby advancing the state of the useful arts, by providing methods and apparatus for improved testing of CRC error recovery in storage systems. Features and aspects hereof provide for a bridge device that couples one or more Serial Attached SCSI (SAS) initiators to a storage device. The storage device may be a Serial Advanced Technology Attachment (SATA) storage device or any other non-SAS attached storage device. The bridge device is coupled to the storage device in its nominal mechanical and electrical coupling to the storage controller and therefore does not alter the physical mounting of the storage device in the storage system or the electrical characteristics of the coupling between the storage controller(s) and the storage device. The bridge device is enhanced in accordance with features and aspects hereof to controllably enabling injection of CRC errors in the communication path between the storage controller(s) and the storage device. The enhanced bridge device may provide programmable options regarding the specific CRC error to be generated as well as the number and frequency of such CRC errors to be injected. Still further, the enhanced bridge device may maintain log information regarding the injected errors and the recovery processing of the errors. Still further, the enhanced bridge device may provide such CRC error injection on behalf of any of multiple SAS initiators (e.g., multiple storage controllers) coupled through the bridge to the storage device.

In one aspect hereof, a communication bridge is provided. The bridge includes a Serial Attached SCSI (SAS) port for coupling to a SAS initiator device and a second port, coupled to the SAS port, for coupling to a target device. The SAS initiator device and the target device exchange information through the bridge. The bridge also includes a Cyclic Redundancy Check (CRC) error injector adapted to controllably inject a CRC error in an exchange between the target device and the SAS initiator device. In one aspect, the bridge may be further adapted to receive parameters from the SAS initiator as a SCSI Mode Page containing Vendor Unique fields and/or non-vendor unique fields directing the bridge regarding injection of CRC errors. In another aspect, the bridge includes a maintenance port for coupling to an administrative client and receives parameters from the administrative client directing the bridge regarding injection of CRC errors. In still another aspect, the bridge is adapted to receive parameters from the SAS initiator as an out of band communication directing the bridge regarding injection of CRC errors.

Another aspect hereof provides a storage system including a plurality of SAS initiators and a plurality of target storage devices. Further the system includes a plurality of bridge devices each coupled to a corresponding one of the plurality for target storage devices and each coupled to one or more of the plurality of SAS initiators to enable exchanges between the one or more SAS initiators and the corresponding target storage device. Each bridge device further comprises a Cyclic Redundancy Check error injector for controllably injecting CRC errors in exchanges between its corresponding target storage device and the one or more SAS initiators coupled to the bridge device. Each bridge device may be adapted to receive parameters from the one or more SAS initiators as a SCSI Mode Page containing Vendor Unique fields and/or non-vendor unique fields directing the bridge device regarding injection of CRC errors. In another aspect each bridge device further comprises a maintenance port for coupling to an administrative client. Each bridge device is then adapted to receive parameters from the administrative client directing the bridge device regarding injection of CRC errors. In still another aspect, each bridge device is adapted to receive parameters from the one or more SAS initiators as out of band communications directing the bridge regarding injection of CRC errors. In yet another aspect, each bridge device further comprises a log memory adapted to store log information relating to injected CRC errors.

DETAILED DESCRIPTION OF THE DRAWINGS

Figure 1:
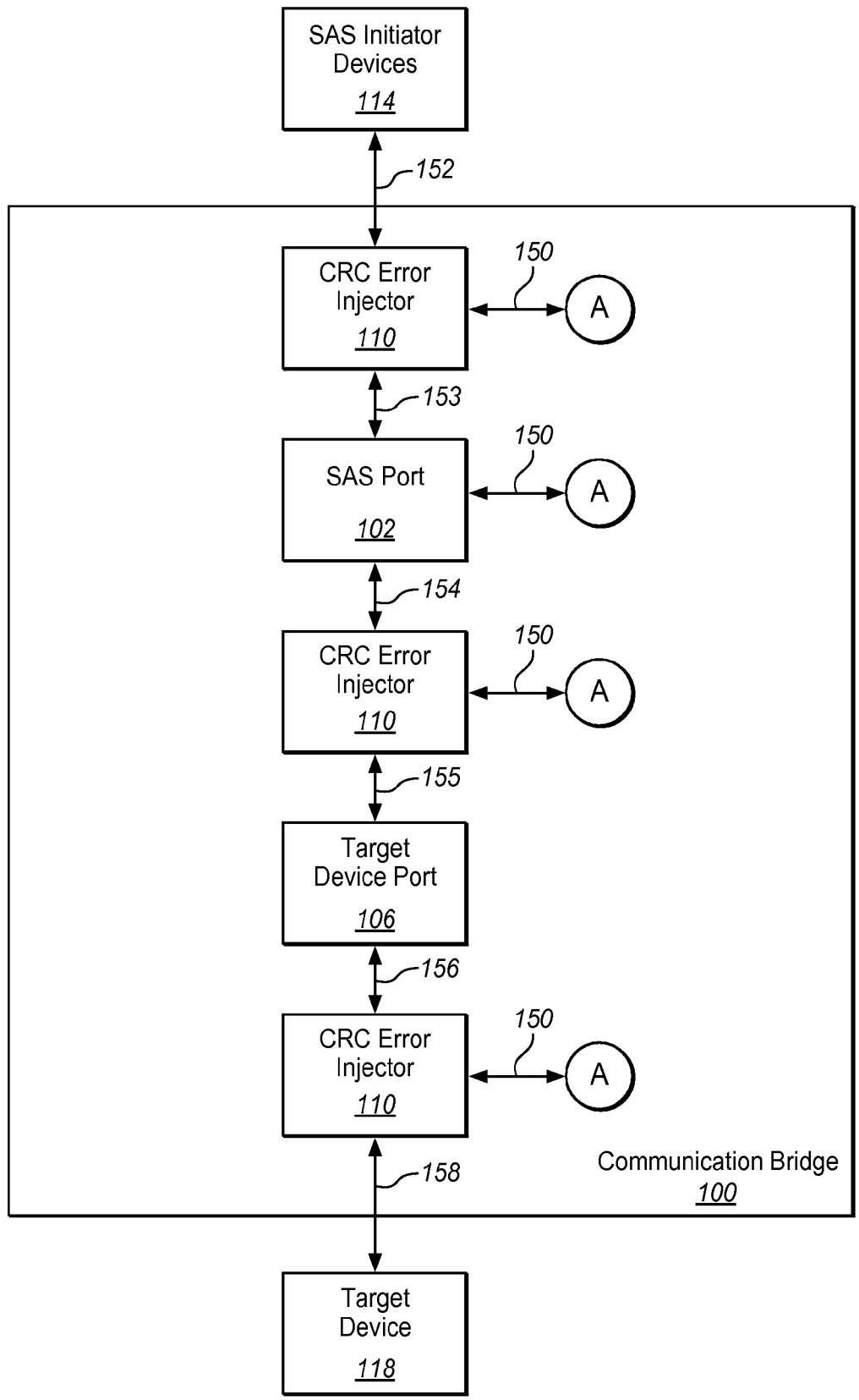
FIG. 1 is a block diagram of an exemplary bridge device enhanced in accordance with features and aspects hereof to provide CRC error injection for test and debug.

FIG. 1 is a block diagram of a communication bridge 100 enhanced in accordance with features and aspects hereof to provide automated CRC error injection into the data exchanges, in either direction, between an initiator device 114 and a target device 118 each coupled to the bridge. In one exemplary embodiment, communication bridge 100 serves as a bridge for communication between one or more SAS initiator devices 114 coupled to the bridge via path 152 and a corresponding, non-SAS target device 118 coupled to the bridge via path 158. Communication bridge 100 may be persistently coupled to target device 118 so as to permit mechanical and electrical coupling within a larger storage enclosure utilizing standard mounting and electronic coupling features within the enclosure. By contrast to prior jammer technologies, communication bridge 100 may be a persistent component within a storage system and thus persistently coupled with an associated target device 118.

Communication bridge 100 includes one or more CRC error injectors 110 positioned intermediate paths 152 and 158 to inject CRC errors on various of the communication paths through the bridge between initiator 114 and target device 118. Communication bridge 100 includes SAS port 102 for coupling to one or more SAS initiator devices 114 via paths 152 and 153 through CRC error injector 110. Those of ordinary skill in the art will readily recognize that path 152 may be a direct SAS connection or may be a more flexible connection through a SAS fabric of a SAS domain. Such a fabric may include, for example, any number of SAS expanders to provide flexible, selectable connectivity between any of the initiators and any of the targets. SAS port 102 therefore provides a mechanism for exchanges between bridge 100 via path 152 and one or more SAS initiator devices 114.

Communication bridge 100 also includes a second port as target device port 106 for coupling a target device 118 to the bridge via paths 158 and 156 through CRC error injector 110. In one exemplary embodiment, target device port 106 may be a SATA port for coupling a SATA target device to the bridge. Those of ordinary skill in the art will recognize numerous protocols and communication media other than SAS that may be applied in coupling the bridge communication device 100 to a target device 118. For example, Parallel ATA (PATA), Universal Serial Bus (USB), and numerous other potential attachments for supporting target devices may be utilized.

Such SAS/SATA exchanges in either direction are converted by SAS port 102 and target device port 106 to an appropriate protocol and media for eventual transfer through bridge 100 to target device 118 or to the initiator device 114.

CRC error injectors 110 of communication bridge 100 enhance operation of the bridge 100 by providing controllable injection of a CRC error conditions. Control logic within CRC error injectors 110 responds to external signals (e.g., signals applied to path 150 from SAS port 102 labeled "A") to enable injection of CRC errors in accordance with particular requested parameters from, for example, SAS port 102. Other control signals (or lack of signals) on path 150 causes all data transmissions to pass through CRC error injectors 110 directly between target device port 106 and the target device 118 without any alteration. In particular, SAS port 102 may detect information transmitted over the SAS communication media 152 from SAS initiator devices 114 requesting that one or more of the CRC error injectors 110 begin injecting specified CRC errors. Such a transmission may be, for example, a SCSI Mode Page command including information in Vendor Unique fields and/or non-Vendor Unique fields of such a command. Alternatively, SAS initiator devices 114 may forward out of band communications over SAS link 152 that may be detected by SAS port 102 for generation of an appropriate signal on path 150 to cause one or more CRC error injectors 110 to operate as desired. Parameters of the injection may include, for example, random error injection, injection of altered CRC codes in a transmission, injection of errors in particular types of transmission, injection of errors at particular positions of data in transmissions, etc.

As shown in FIG. 1 bridge 100 may include one or more CRC error injectors positioned in different portions of the paths in bridge 100 between path 152 and path 158. For example, a first CRC error injector 110 may be positioned between paths 152 and 153 to inject errors in SAS transmissions in either direction between the SAS port 102 and the initiator devices 114. A second CRC error injector 110 may be positioned between paths 154 and 155 to inject CRC errors in transmissions in either direction between SAS port 102 and target device port 106. Yet another CRC error injector 110 may be positioned between paths 156 and 158 to inject CRC errors in transmissions in either direction between target device 118 and target device port 106. Each such CRC error injector is coupled to path 150 to receive parameters for errors to be injected and each injector 110 may be individually controlled by such parameters. Further, those of ordinary skill in the art will recognize that fewer may be configured in bridge 100 or additional injectors may be added to bridge 100.

Figure 2:
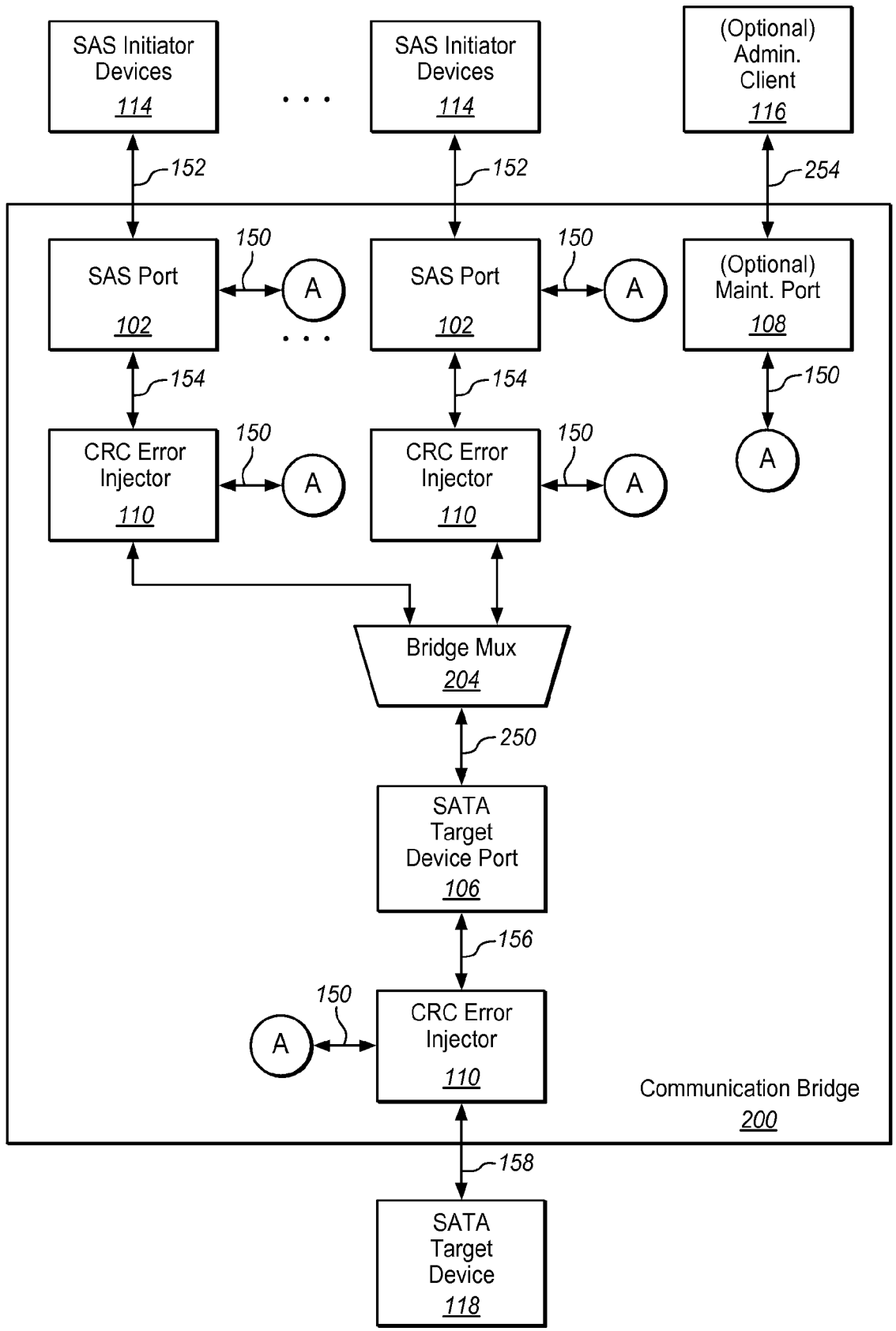
FIG. 2 is a block diagram of another exemplary bridge device enhanced in accordance with features and aspects hereof to provide CRC error injection for test and debug.

FIG. 2 is a block diagram of another exemplary embodiment of features and aspects hereof comprising a communication bridge 200 similar in many respects to communication bridge 100 of FIG. 1. A plurality of SAS initiator devices 114 are each coupled to communication bridge 200 via corresponding communication media 152 through a corresponding plurality of SAS ports 102 in communication bridge 200. Communication bridge 200 includes multiple SAS ports 102 each adapted for coupling to a specific SAS initiator device 114 or adapted to couple through a fabric 152 to any of several SAS initiator devices 114. Bridge control logic (not shown but discussed in the related patents) controls multiplexor 104 to select among the various SAS ports 102 based on criteria discussed in the bridge patents noted above and incorporated herein by reference. Multiplexer 104 may controllably select one or another of the multiple initiators (114) for coupling with a SATA target device 118 coupled to communication bridge 200 through path 158. Thus a selected one of the plurality of SAS initiators 114 may be coupled through communication bridge 200 to the SATA target device port 106 for exchanges with the SATA target device 118.

As above in FIG. 1, a first CRC error injector 110 of communication bridge 200 is electronically coupled between target device port 106 and SATA target device 118 coupled thereto (i.e., between paths 156 and 158). Based on control signals and other information applied to CRC error injector 110 via path 150, data communications may be passed unchanged from target device port 106 to target device 118 or, in the alternative, CRC errors may be injected into the information to be exchanged between target device port 106 and target device 118. As noted above, CRC error injector 110 may receive control signals via path 150 (label "A") from any of SAS ports 102 requesting particular parameters for the injection of CRC errors. Exemplary of the particular parameters of the injection may include, for example, random error injection, injection of altered CRC codes in a transmission, injection of errors in particular types of transmission, injection of errors at particular positions of data in transmissions, etc.

In accordance with features and aspects hereof, communication bridge 200 may include an optional maintenance port 108 coupled to receive parameters from an administrative client 116 via path 254 indicating the particular parameters to be applied for testing the standard recovery error processing. Administrative client 116 may be any process operable on any computing device coupled to the bridge 200 via path 254 and optional maintenance port 108. Optional maintenance port 108 then communicates received parameters via path 150 to CRC error injector 110.

In addition, bridge 200 may include additional CRC error injectors in other paths within the bridge to permit controlled CRC error injection in other paths. For example, additional CRC error injectors 110 are positioned between each SAS port 102 and Mux 204 to permit injection of errors in the SAS communications applied through those intermediate paths of bridge 200. As above, and as discussed with respect to FIG. 1 each CRC error injector 110 may receive signals via path 150 to provide parameters of the CRC errors to be injected. Also, as shown in FIG. 1 though not shown in FIG. 2 for simplicity, still more CRC error injectors may be interposed between each SAS port 102 and the communication medium 152 coupled thereto to permit injection of CRC errors in the SAS communications with the initiators 114. As noted in FIG. 1 those of ordinary skill in the art will recognize that any number of CRC error injectors my be configured in the bridge 200 to provide further flexibility in determining where errors are to be injected in communications through bridge 200.

Figure 3:
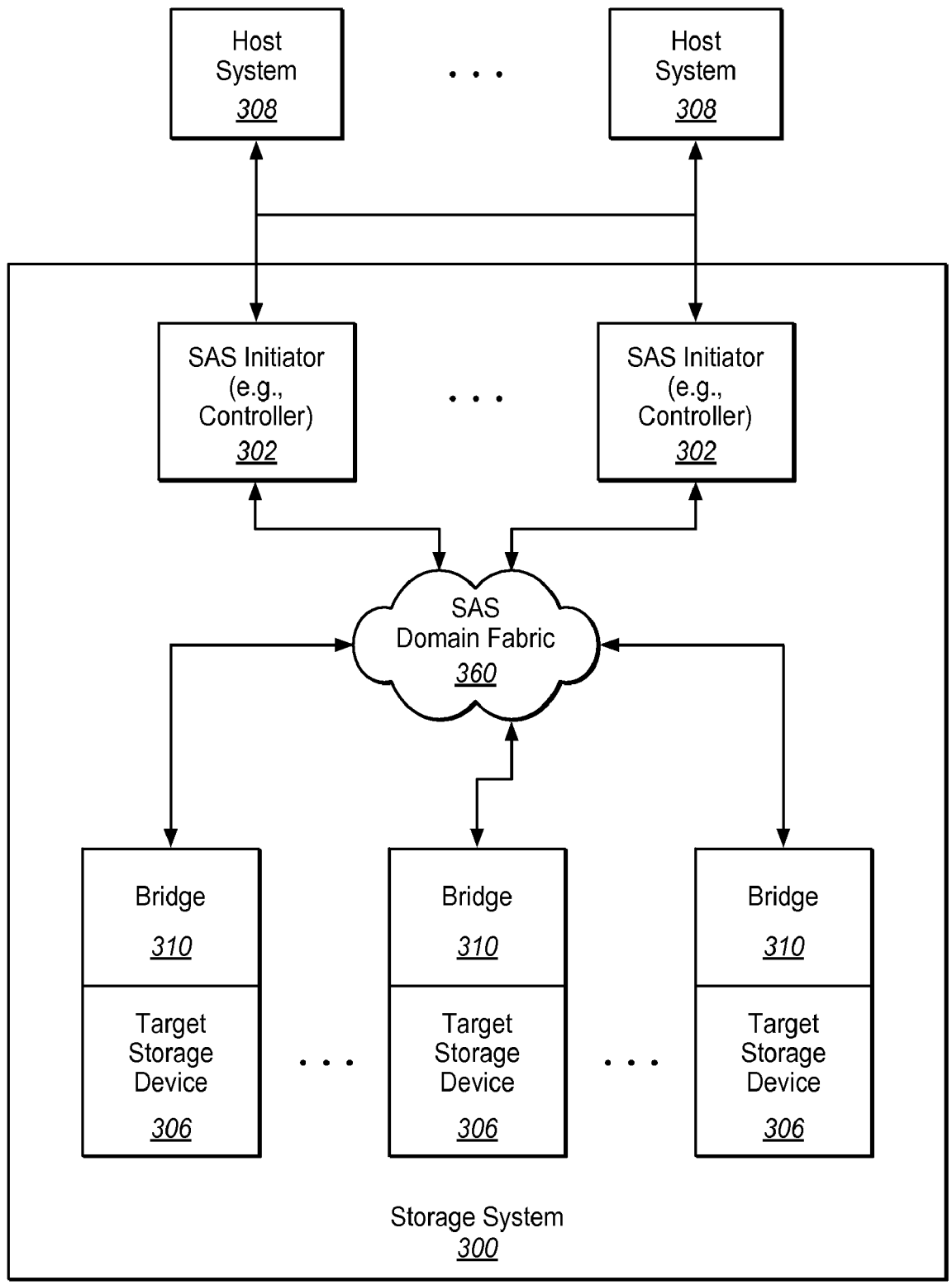
FIG. 3 is a block diagram of a storage system enhanced in accordance with features and aspects hereof to include a plurality of bridge devices such as shown in FIGS. 1 and 2 and enhanced to provide CRC error injection.

FIG. 3 is a block diagram of an exemplary storage system 300 in accordance with features and aspects hereof. System 300 integrates multiple SAS initiators 302 (e.g., storage controllers) with multiple target storage devices 306 (e.g., disk drives). Each target storage device 306 is persistently coupled to a bridge device 310 (e.g., such as bridge circuits 100 or 200 of FIGS. 1 and 2, respectively). Each bridge device 310 is persistently coupled to (e.g., integral with) a corresponding target storage device 306 so that the bridge device 310 may be persistently positioned mechanically and electronically within a storage system enclosure thus alleviating problems of prior techniques with ad hoc insertion of a jammer device. Each bridge device 310 couples its corresponding target storage device 306 to a SAS domain fabric 360 within storage system 300. In addition, each of the plurality of SAS initiators 302 is also coupled to SAS domain fabric 360 to permit coupling of any of the plurality of SAS initiators 302 to any of the plurality of targets storage devices 306 each persistently coupled to a corresponding bridge device 310. Host systems 308 are coupled to storage system 300 through any suitable communication medium such as Ethernet, parallel SCSI, SAS, Fibre Channel, etc.

As discussed above, each bridge device 310 includes appropriate control logic to permit transmissions to pass directly through the bridge between a SAS initiator 308 and a corresponding target storage device 306. When appropriately controlled, one or more bridge devices 310 begin inserting/injecting CRC errors into communications along their corresponding paths. The CRC errors are injected in accordance with parameters of a request from the corresponding SAS initiator or, as noted above, from an administrative client coupled through a maintenance port of the bridge device.

Figure 4:
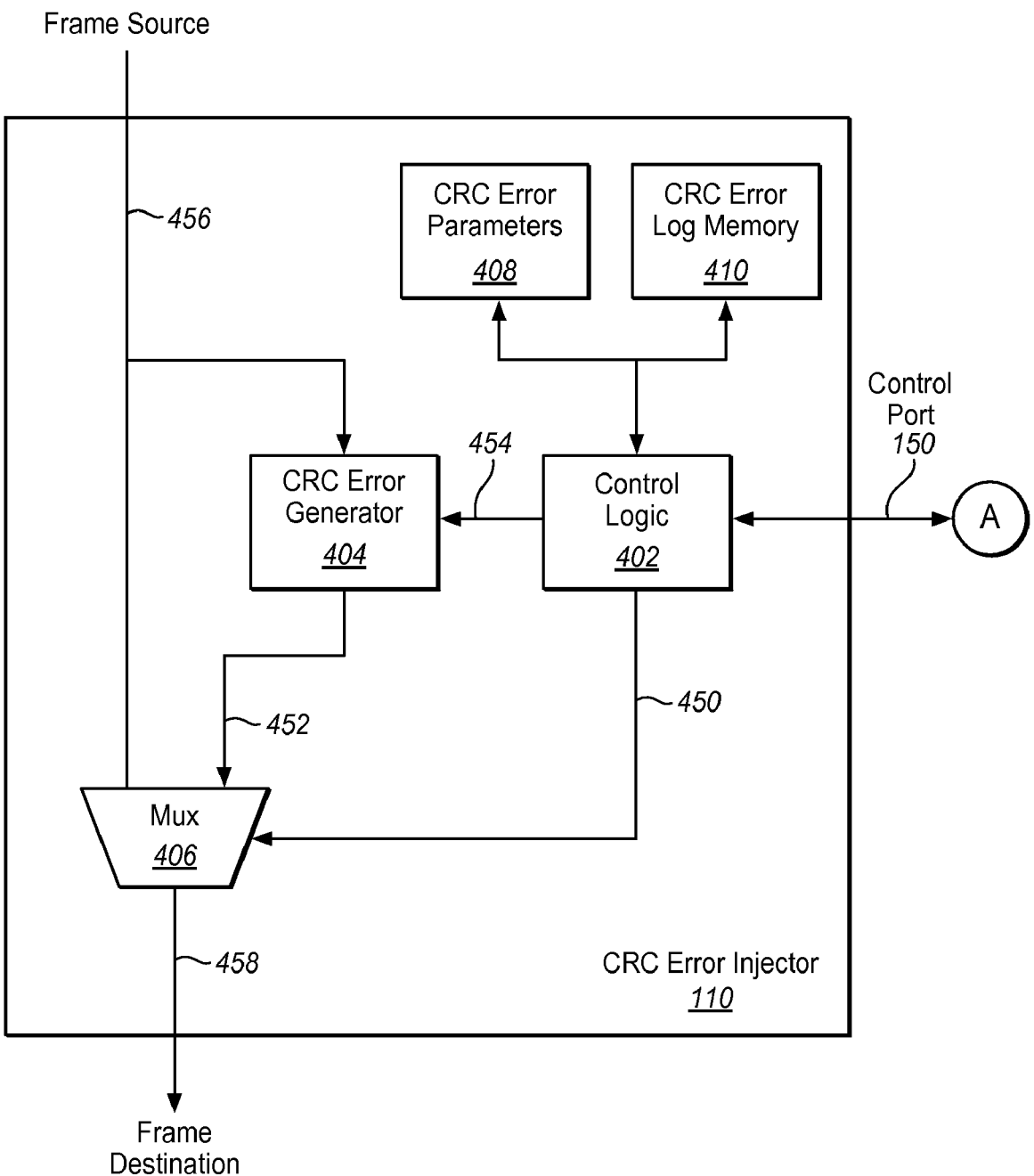
FIG. 4 is a block diagram providing exemplary additional details of the structure of bridge devices such as shown in FIGS. 1 through 3 enhanced in accordance with features and aspects hereof to provide automated CRC error injection.

FIG. 4 is a block diagram providing additional exemplary details of the structure of a CRC error injector 110 such as discussed above with respect to FIGS. 1 and 2. CRC error injector 110 receives transmissions from a frame source destined for a frame destination. As noted above, CRC error injectors 110 of FIGS. 1 and 2 operate for transmission in either direction. The exemplary details of FIG. 4 suggest one direction of transmissions for which errors may be injected. The exemplary circuitry of FIG. 4 may thus be replicated and/or controllably switched to provide for CRC error injection in the opposite direction of data transmissions. Such replication or switching would be readily apparent to those of ordinary skill in the art and thus such details are omitted herein for simplicity and brevity of this discussion.

When appropriately controlled, multiplexer 406 passes such transmissions directly through from the frame source to the frame destination. Control logic 402 generates an appropriate selection signal for multiplexer 406 to either pass through the data transmissions between the source and destination unaltered or to inject a CRC error generated by CRC error generator 404. CRC error generator 404 receives the data transmission from the frame source and alters the received information in accordance with control parameters received from control logic 402 on path 454. The altered information is then forwarded to the intended destination through multiplexer 406.

Parameters for injection of the CRC errors are received on path 150 as discussed above from a SAS port of the bridge and/or from a maintenance port within the bridge. These error parameters may be stored in CRC error injector 110 in a suitable memory 408. CRC error injector 110 may also include a CRC error log memory 410 coupled to control logic 402 for logging information regarding generation and transmission of the various CRC errors. CRC error log memory 410 may be any suitable memory including flash memory and other non-volatile or volatile memory components. A SAS initiator or an administrative client coupled through a maintenance port of the bridge may request return of the logged information through control port 150. Logging of information may use well known circular buffer techniques to store more recent information as older information is discarded. In the alternative, a fixed maximum size of logged information may be stored such that when the log memory 410 is full, logging of further error information will cease until the contents are fetched and cleared. Similar communication techniques to those described above to control the error injection may be employed to fetch and/or clear the log memory 410 content (e.g., out of band communications, vendor unique and non-vendor unique fields in SAS commands/responses, maintenance port communications, etc.).

Those of ordinary skill in the art will readily recognized numerous additional and equivalent elements present in fully functional circuits as generally depicted in FIGS. 1 through 4. Such additional and equivalent elements are omitted herein for simplicity and brevity of this discussion. Further, those of ordinary skill in the art will recognize that each CRC error injector, positioned in any communication path of the bridge, may receive parameters to inject CRC errors from any signal source coupled to its control signal path. Thus a CRC error injector may receive parameters to initiate CRC error injection from any SAS initiator coupled to the bridge on any SAS port. For example, a CRC error injector coupled in a path of the bridge associated with a first SAS port (and/or a first SAS initiator) may receive parameters to start or stop error injection from that first SAS port/initiator or from any second/other SAS port of the bridge associated with any other SAS initiator. Further, for example, through the maintenance port of the bridge, the administrative client may provide parameters to start or stop error injection on any of the CRC error injectors of the bridge.

Figure 5:
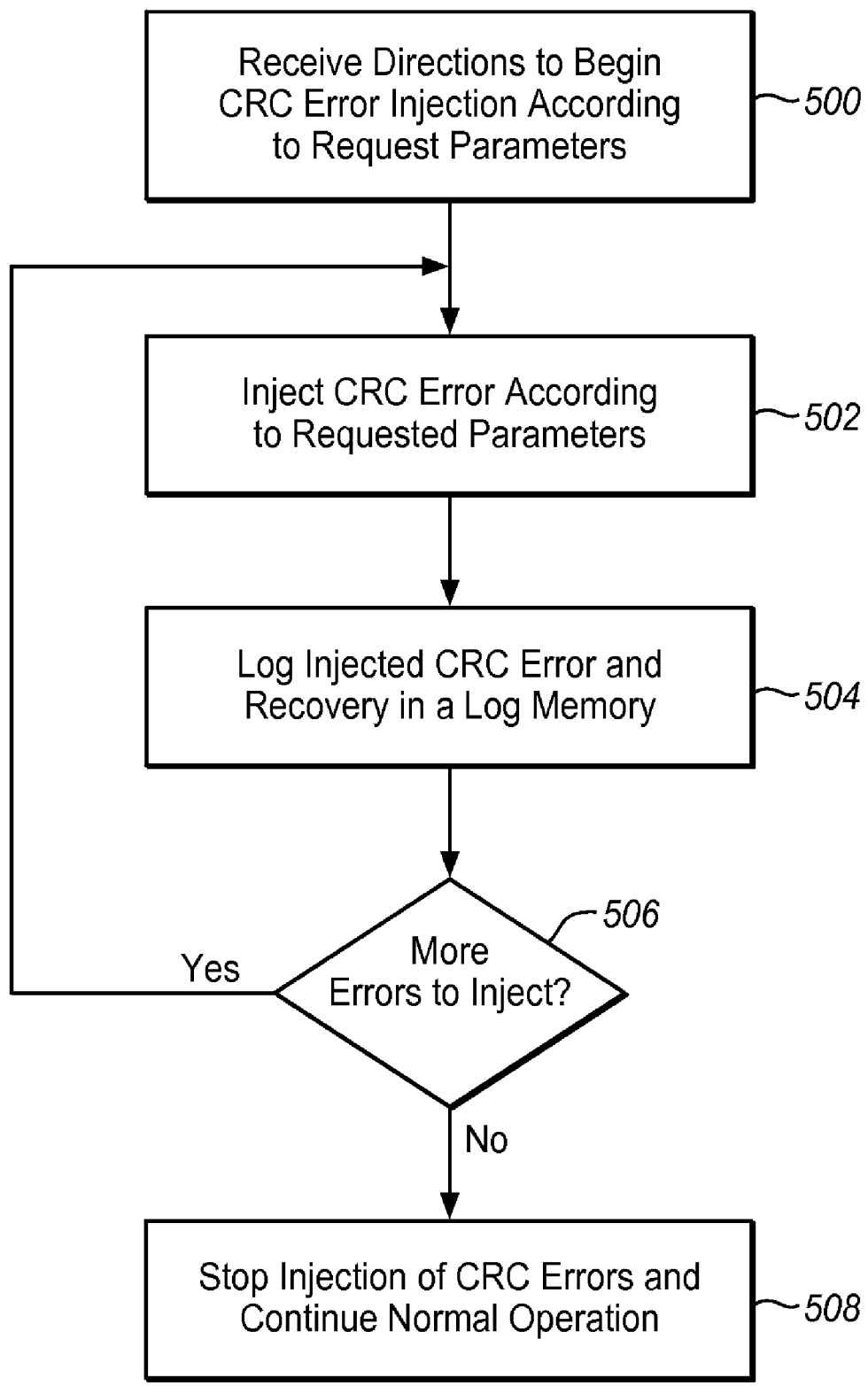
FIG. 5 is a flowchart describing an exemplary method in accordance with features and aspects hereof to provide automated CRC error injection through use of a bridge device between one or more SAS initiators and a corresponding non-SAS target device.

FIG. 5 is a flowchart describing an exemplary method in accordance with features and aspects hereof for providing CRC error injection capability in a bridge device coupling multiple SAS initiators to a non-SAS target device. Step 500 represents processing to receive parameters to begin injection of CRC errors in the exchanges between a presently selected one of the plurality of SAS initiators and the target device associated with the bridge device (e.g., persistently coupled to the bridge device). As noted, the received parameters may be provided by an administrative client coupled to the bridge through a maintenance port or from any of the SAS ports (coupled to any of the SAS initiators using the bridge). The parameters may specify, for example, the bit position of desired CRC error to be injected in a buffer or frame as well as the frequency or other timing aspects of the CRC error to be injected. Step 502 then injects a CRC error in the next transmission between the identified SAS initiator and the target device in accordance with the parameters provided by the request received a step 500. Step 504 then optionally logs information related to the injected error in a log memory associated with the CRC error injection of the bridge device. Step 506 then determines whether the parameters received at step 500 require ongoing further errors be injected in the same buffer/frame or in subsequent buffers/frames. If additional errors remain to be injected in the data stream, processing continues looping back to step 502. Otherwise, processing continues at step 508 to discontinue injection of the CRC errors and to continue normal processing of data exchanges between each of the SAS initiators and the target device.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A communication bridge comprising:
   a Serial Attached SCSI (SAS) port for coupling to a SAS initiator device;
   a second port, coupled with the SAS port, for coupling with a non-SAS target device wherein the SAS initiator device and the target device exchange information through the bridge and the bridge is configured to convert between SAS protocol communications of the initiator device and non-SAS protocol communications of the target device; and
   a Cyclic Redundancy Check (CRC) error injector configured to controllably inject a CRC error in an exchange between the target device and the SAS initiator device.

2. The bridge of claim 1
   wherein the bridge is responsive to parameters received from the SAS initiator device to controllably inject CRC errors in exchanges with the bridge.

3. The bridge of claim 2
   wherein the bridge is configured to receive parameters from the SAS initiator as a SCSI Mode Page using Vendor Unique fields and/or non-Vendor Unique fields directing the bridge regarding injection of CRC errors.

4. The bridge of claim 2 further comprising:
   a maintenance port for coupling to an administrative client,
   wherein the bridge is configured to receive parameters from an administrative client directing the bridge regarding injection of CRC errors.

5. The bridge of claim 2
   wherein the bridge is configured to receive parameters from the SAS initiator as an out of band communication directing the bridge regarding injection of CRC errors.

6. The bridge of claim 1 further comprising:
   a plurality of SAS ports for coupling multiple SAS initiator devices to the bridge; and
   a multiplexor coupled to the plurality of SAS ports and coupled to the target device port and configured to controllably select one of the plurality of SAS ports for coupling to the target device port,
wherein the bridge is responsive to perform error injection based on parameters received from any of the multiple SAS initiators.

7. The bridge of claim 1 further comprising:
a log memory configured to store log information relating to injected CRC errors.

8. The bridge of claim 1
wherein the bridge is integral with the non-SAS target device.

9. The bridge of claim 1
wherein the bridge is further configured to be persistently coupled to the non-SAS target device within a storage system during normal operation of the storage system.

10. The bridge of claim 1
wherein the CRC error injector is further configured to inject a CRC error in any of: communications between the SAS initiator and the SAS port, communications between the SAS port and the second port, and communications between the second port and the target device.

11. In a bridge device coupled between a plurality of Serial Attached SCSI (SAS) initiators and a non-SAS target storage device and configured to convert between SAS protocol communications of the initiators device and non-SAS protocol communications of the target device, a method for injecting Cyclic Redundancy Check (CRC) errors in communications between any of the SAS initiators and the non-SAS target storage device, the method comprising:
receiving parameters from an identified SAS initiator to inject CRC errors in communications between the identified SAS initiator and the non-SAS target storage device; and
injecting the CRC errors in accordance with the parameters received from the identified SAS initiator.

12. The method of claim 11
wherein the step of receiving further comprises:
receiving the parameters as a SCSI Mode Page using at least one of the group comprising Vendor Unique fields and non-Vendor Unique fields.

13. The method of claim 11
wherein the step of receiving further comprises:
receiving the parameters as an out of band transmission from the identified SAS initiator.

14. The method of claim 11 further comprising:
logging within the bridge information regarding the injected CRC errors.

15. The method of claim 11 wherein the bridge device is persistently coupled to the non-SAS target device within a storage system during normal operation of the storage system.

16. A storage system comprising:
a plurality of Serial Attached SCSI (SAS) initiators;
a plurality of non-SAS target storage devices;
a plurality of bridge devices each coupled with a corresponding one of the plurality of non-SAS target storage devices and each coupled with one or more of the plurality of SAS initiators to enable exchanges between the one or more SAS initiators and the corresponding non-SAS target storage device, each bridge configured to convert between SAS protocol communications of the initiator device and non-SAS protocol communications of the target device,
each bridge device further comprising a Cyclic Redundancy Check (CRC) error injector for controllably injecting CRC errors in exchanges between its corresponding non-SAS target storage device and the one or more SAS initiators coupled to the bridge device.

17. The system of claim 16
wherein each bridge device is responsive to parameters received from one or more SAS initiators to controllably inject the CRC errors.

18. The system of claim 16
wherein each bridge device is configured to receive parameters from the one or more SAS initiators as a SCSI Mode Page using Vendor Unique fields and/or non-Vendor Unique fields directing the bridge device regarding injection of CRC errors.

19. The system of claim 16
wherein each bridge device further comprises:
a maintenance port for coupling to an administrative client,
wherein each bridge device is configured to receive parameters from an administrative client directing the bridge device regarding injection of CRC errors.

20. The system of claim 16
wherein each bridge device is configured to receive parameters from the one or more SAS initiators as out of band communications directing the bridge device regarding injection of CRC errors.

21. The system of claim 16
wherein each bridge device is configured to receive parameters from a first SAS initiator of the plurality of SAS initiators directing the bridge device to inject errors in communications involving a second SAS initiator of the plurality of SAS initiators coupled to the same bridge device.

22. The system of claim 16
wherein each bridge is integral with a non-SAS target device.

23. The system of claim 16
wherein each bridge is persistently coupled to a non-SAS target device within the storage system during normal operation of the storage system.

* * * * *